US012670799B2

(12) United States Patent
Picaut et al.

(10) Patent No.: US 12,670,799 B2
(45) Date of Patent: Jun. 30, 2026

(54) METHOD OF ASSISTING AN AIRCRAFT IN LANDING ON A RUNWAY AND ASSOCIATED SYSTEM

(71) Applicant: DASSAULT AVIATION, Paris (FR)

(72) Inventors: Stéphane Picaut, Merignac (FR); Yann Coureaud, Merignac (FR)

(73) Assignee: DASSAULT AVIATION, Paris (FR)

( * ) Notice: Subject to any disclaimer, the term of this patent is extended or adjusted under 35 U.S.C. 154(b) by 115 days.

(21) Appl. No.: 18/608,913

(22) Filed: Mar. 18, 2024

(65) Prior Publication Data

US 2024/0321125 A1 Sep. 26, 2024

(30) Foreign Application Priority Data

Mar. 20, 2023 (FR) ..................................... 23 02542

(51) Int. Cl.

| | |
|---|---|
| ***G08G 5/02*** | (2006.01) |
| ***G08G 5/21*** | (2025.01) |
| ***G08G 5/50*** | (2025.01) |
| ***G08G 5/54*** | (2025.01) |
| ***G08G 5/55*** | (2025.01) |

(52) U.S. Cl.

CPC ................. *G08G 5/54* (2025.01); *G08G 5/21* (2025.01); *G08G 5/50* (2025.01); *G08G 5/55* (2025.01)

(58) Field of Classification Search

CPC ............ G08G 5/025; G08G 5/54; G08G 5/21; G08G 5/50; G08G 5/0021; G08G 5/04; G08G 5/0047

USPC ............................................................ 701/16

See application file for complete search history.

(56) References Cited

U.S. PATENT DOCUMENTS 7,853,370 B2 * 12/2010 Coulmeau ................ G08G 5/21 701/16
9,430,948 B2 * 8/2016 Henderson ............. G01C 23/00
9,544,741 B2 * 1/2017 Nishikawa .............. G01S 19/33
10,497,271 B2 * 12/2019 Schwartz ................. G08G 5/51
2004/0026992 A1 2/2004 Villaume et al.
2005/0006524 A1 1/2005 Villaume et al.
2008/0162092 A1 7/2008 Coulmeau et al.
2012/0296498 A1 11/2012 Essadouni et al.

FOREIGN PATENT DOCUMENTS

EP 2933791 A1 10/2015
EP 3725679 A1 10/2020

OTHER PUBLICATIONS

Search Report for priority application FR 23 02542.

* cited by examiner

*Primary Examiner* — Andrew Joseph Rudy
(74) *Attorney, Agent, or Firm* — Davidson Kappel LLC

(57) ABSTRACT

A method for assisting an aircraft in landing on a runway and an associated system includes determining a target exit point from the runway and a target taxi speed at which the aircraft has to take the target exit; calculating a target ground distance representative of a ground deceleration phase; and calculating the position of a target touchdown point on the basis of the target ground distance. The target ground distance is calculated as a function of a target deceleration profile for the aircraft to reach the target exit point at the target taxi speed.

19 Claims, 7 Drawing Sheets

METHOD OF ASSISTING AN AIRCRAFT IN LANDING ON A RUNWAY AND ASSOCIATED SYSTEM

The present disclosure relates to a method of assisting an aircraft to land on a runway.

The present disclosure further relates to a method of assisting an aircraft to land on a runway, of the type comprising the following steps, implemented before the aircraft touches down on the runway:

- determining a target exit point for exiting the runway, to be taken by the aircraft and a target taxi speed which the aircraft has to take the target exit;
- calculation of a target ground distance representative of a ground deceleration phase of the aircraft;
- calculating the position of a target touchdown point on the basis of the target ground distance.

BACKGROUND

Such a method is intended to be implemented, in particular, when the aircraft is landing on the runway, particularly with the aim of predicting and reducing the runway occupancy time taken by the aircraft.

When air traffic is heavy, the prediction and reduction of runway occupancy time, particularly during landing, is paramount. For example, when a first aircraft occupies the runway, a second approaching aircraft may be forced to postpone its landing and perform a holding circuit or a lap around the runway while waiting for the runway to be cleared. This circling or holding pattern results in a loss of time for the second aircraft and, eventually, any following aircraft. Thus, the load on air traffic is increased and a negative impact on safety ensues. Furthermore, the extra fuel consumption associated with circling has a negative impact on the environment. For airports saturated by heavy air traffic, high runway occupancy times also have a negative impact on their operational capacity.

In order to reduce runway occupancy, aircraft are recommended to apply a "Brake-to-vacate" braking optimization technique.

Such a technique involves continuously adjusting braking after the standard touchdown of the aircraft on the runway, so that the aircraft can evacuate the runway at a predetermined exit at a predetermined taxi speed. Such variations in deceleration can, for example, affect passenger comfort during landing. Furthermore, these adjustments do not fully optimize runway occupancy time, nor do they ensure that the desired exit is reached at the appropriate speed, potentially requiring the aircraft to evacuate at the exit following the desired exit.

Devices allow the level of deceleration required to reach the target exit point at the target taxi speed to be regulated automatically.

However, this automatic regulation of the deceleration level is complex, as it requires deceleration of variable intensity throughout the braking process.

In addition, these devices do not influence the time spent by the aircraft in flight during landing. However, this time is included in the runway occupancy time, since the said runway is reserved for the aircraft and cannot be used by any other aircraft. These devices therefore do not fully optimize the runway occupancy time of the aircraft.

SUMMARY

One aim of the present disclosure is therefore to obtain a method of assisting an aircraft to land on a runway which results in a reduced runway occupancy time and offers greater comfort to the occupants of the aircraft.

To this end, the present disclosure has as an object, a method of the aforementioned type, characterized in that the target ground distance is calculated as a function of a target deceleration profile, the target deceleration profile comprising at least one portion of target constant deceleration portion between a target constant deceleration establishment point located downstream of the target touchdown point and the target exit point, so that the aircraft reaches the target exit point at the target taxi speed.

The method according to the present disclosure may comprise one or more of the following features, taken alone or in any technically possible combination:

- the target deceleration profile further comprises at least one transient portion between the target touchdown point and the target constant deceleration establishment point;
- the position of the target touchdown point is calculated so that a target air distance representative of an in-flight approach phase of the aircraft, taken along the runway between an upstream threshold of the runway and the target touchdown point, is equal to a maximum ground distance separating the upstream threshold from the target exit point minus the target ground distance;
- the target ground distance is calculated by the equation:

$$d_{2i} = d_{trans\_i} + \frac{v_{sortie\_i}^2 - v_{trans\_i}^2}{2 \times a_i}$$

wherein:

- $d_{2i}$ is the target ground distance;
- $d_{trans\_i}$ is a target transition distance covered by the aircraft between the target touchdown point and the target constant deceleration establishment point;
- $v_{trans\_i}$ is a target speed of the aircraft at the target constant deceleration establishment point;
- $v_{sortie\_i}$ is the target taxi speed of the aircraft; and
- $a_i$ is a value, in particular a negative value, of the target constant deceleration;
- the method further comprises a step of determining the target deceleration profile as a function of runway parameters, advantageously further as a function of the touchdown speed of the aircraft and touchdown landing condition parameters;
- the method comprises a step for calculating a target runway occupancy time as a function of the target exit point, the target taxi speed, the target touchdown point position and the target deceleration profile and, advantageously, the aircraft attitude profile and/or thrust profile;
- a landing path of the aircraft comprises:
- a first portion over which the aircraft altitude is greater than a nominal altitude; and
- a second portion over which the altitude of the aircraft is less than the nominal altitude;
- the method further comprises a step of generating at least one in-flight guidance information for guiding the aircraft, representative of a guidance of the aircraft toward the target touchdown point, the in-flight guidance being carried out on the first portion and/or on the second portion;
- the in-flight guidance information comprises an attitude profile and/or a thrust profile of the aircraft;

the in-flight guidance information is displayed on a display for at least one pilot of the aircraft;

the altitude of the aircraft is substantially equal to the nominal altitude when the aircraft is above an upstream threshold of the runway;

an onboard computer of the aircraft automatically guides the aircraft toward the target touchdown point;

when a runway end distance, taken along the runway between the target exit point and a downstream threshold of the runway, is less than a safety distance, the target touchdown point is brought closer to an upstream threshold of the runway so that the runway end distance is greater than or equal to the safety distance;

the method further comprises the following steps, implemented after the aircraft has touched down on the runway:

determining an actual touchdown point;

determining an actual ground distance taken along the runway between the actual touchdown point and the target exit point;

determining an actual deceleration profile, the actual deceleration profile comprising at least one actual constant deceleration portion between an actual constant deceleration establishment point located downstream of the actual touchdown point and the target exit point, so that a ground speed of the aircraft is the target taxi speed when the aircraft has covered the actual ground distance on the ground;

the actual deceleration profile further comprises at least one transient portion between the actual touchdown point and the actual target constant deceleration establishment point; and the value of the actual constant deceleration $a_f$ is calculated by the equation:

$$a_f = \frac{v_{sortie\_i}^2 - v_{trans\_f}^2}{2 \times (d_{2f} - d_{trans\_f})}$$

wherein:

$v_{trans\_f}$ is an actual aircraft speed at the actual constant deceleration establishment point;

$v_{sortie\_i}$ is the target taxi speed of the aircraft;

$d_{2f}$ is the actual ground distance; and $d_{trans\_f}$ is an actual transition distance covered by the aircraft between the actual touchdown point and the actual constant deceleration establishment point; and the method comprises a step of calculating an actual runway occupancy time as a function of the time at which the aircraft passes above the upstream threshold and the time at which the aircraft takes the target exit.

The present disclosure also has as an object a system for assisting an aircraft to land on a runway, of the type comprising:

a module for determining a target exit point from the runway to be taken by the aircraft, and a target taxi speed at which the aircraft has to take the target exit;

a module for calculating a target ground distance representative of a ground deceleration phase of the aircraft;

a module for calculating the position of a target touchdown point on the basis of the target ground distance;

the system being characterized in that the target ground distance is calculated as a function of a target deceleration profile, the target deceleration profile comprising at least one target constant deceleration portion between a target constant deceleration establishment point located downstream of the target touchdown point and the target exit point, so that the aircraft reaches the target exit point at the target taxi speed.

Optionally, the target deceleration profile further comprises at least one transient portion between the target touchdown point and the target constant deceleration establishment point.

Optionally, the system further comprises:

an acquisition module able to determine the position of the actual touchdown point;

a module for calculating an actual ground distance taken along the runway between the actual touchdown point and the target exit point;

a module for determining an actual deceleration profile, the actual deceleration profile comprising at least one actual constant deceleration portion between an actual constant deceleration establishment point located downstream of the actual touchdown point and the target exit point, so that a ground speed of the aircraft is the target taxi speed when the aircraft has covered the actual ground distance on the ground.

Optionally still, the actual deceleration profile further comprises at least one transient portion between the actual touchdown point and the actual constant deceleration establishment point.

BRIEF SUMMARY OF THE DRAWINGS

The present disclosure will be better understood on reading the following description, given by way of example only, and made with reference to the appended drawings.

DETAILED DESCRIPTION

Figure 1:
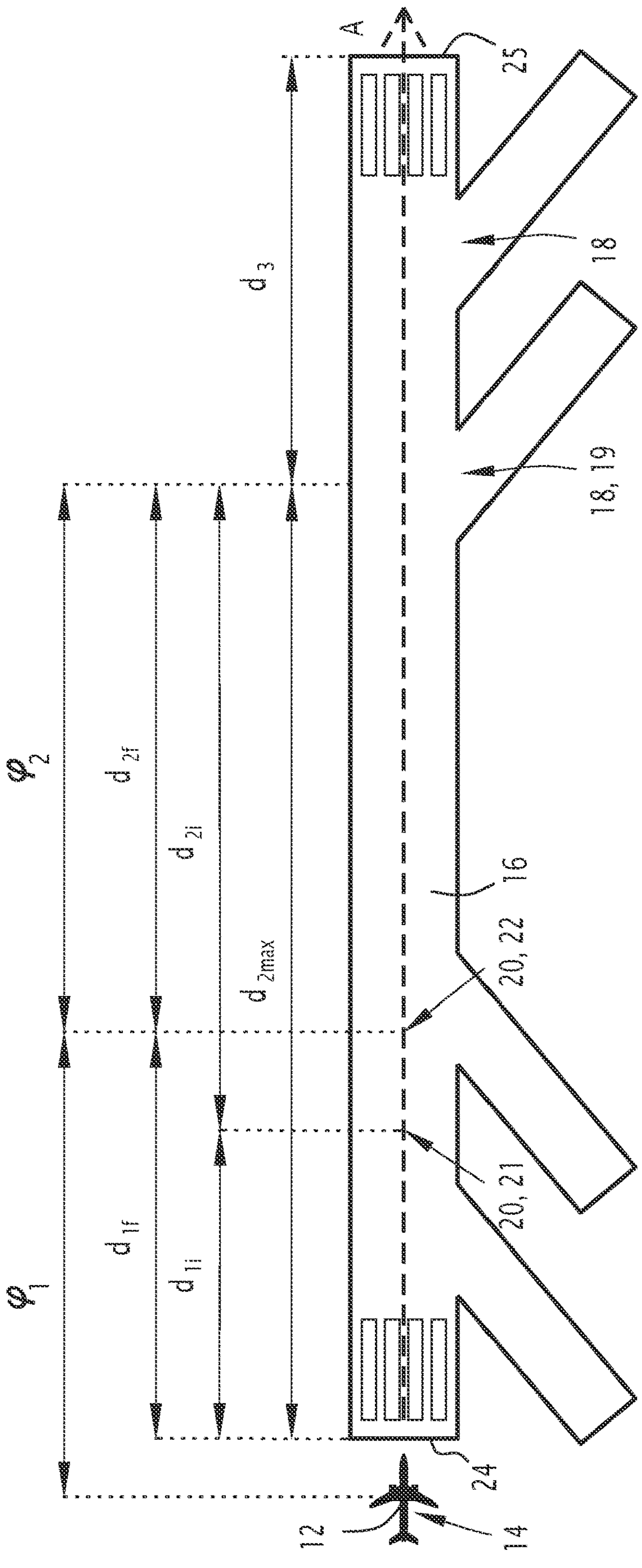
FIG. 1 is a schematic top view of an aircraft and a runway, illustrating various quantities used during implementation of the method according to the present disclosure.

FIG. 1 shows an aircraft 12 during a landing phase. The landing phase is carried out from an initial approach point 14 of the runway 16, representative of the initial position of the aircraft 12, to a point 18 of exit from the runway 16.

An axis A of the runway 16 is defined as being a longitudinal axis extending longitudinally along the runway 16.

The landing phase comprises a first in-flight approach phase $\varphi_1$, during which the aircraft 12 approaches the runway 16 in flight from the initial point 14, then a second ground deceleration phase $\varphi_2$, during which the aircraft 12 decelerates on the ground.

The first phase $\varphi_1$ and the second phase $\varphi_2$ are separated by a touchdown, during which the aircraft 12 touches down on the runway 16 at a touchdown point 20. In other words, during touchdown, at least one landing gear of the aircraft 12 comes into contact with the runway 16 at the touchdown point 20.

During the first phase $\varphi_1$, the aircraft 12 approaches the runway 16 until in line with an upstream threshold 24 of the runway 16, then flies over the runway 16 for an air distance $d_1$ between the upstream threshold 24 and the touchdown point 20.

During the second phase $\varphi_2$, the aircraft 12 decelerates on the ground over a ground distance $d_2$ between the touchdown point 20 and an exit point 18. When the aircraft 12 reaches said exit point 18, the aircraft 12 travels at a speed known as the taxi speed, at which it evacuates the runway 16.

In the following, a distinction will be made between a target landing phase, representative of a desired landing phase, for example, by the crew, and an actual landing phase, representative of an actual landing phase experienced, for example, by the crew. In particular, the magnitudes corresponding to the target landing phase can be identified by an index i, and the magnitudes corresponding to the actual landing phase can be identified by an index f. In FIG. 1, the first phase $\varphi_1$ illustrated, corresponds to the actual first phase and the second phase $\varphi_2$ illustrated, corresponds to the actual second phase of the landing phase.

The landing phase comprises, for example, a target flight approach phase and an actual flight approach phase, during which a target ground deceleration phase is prepared. The landing phase then comprises an actual ground deceleration phase.

Figure 2:
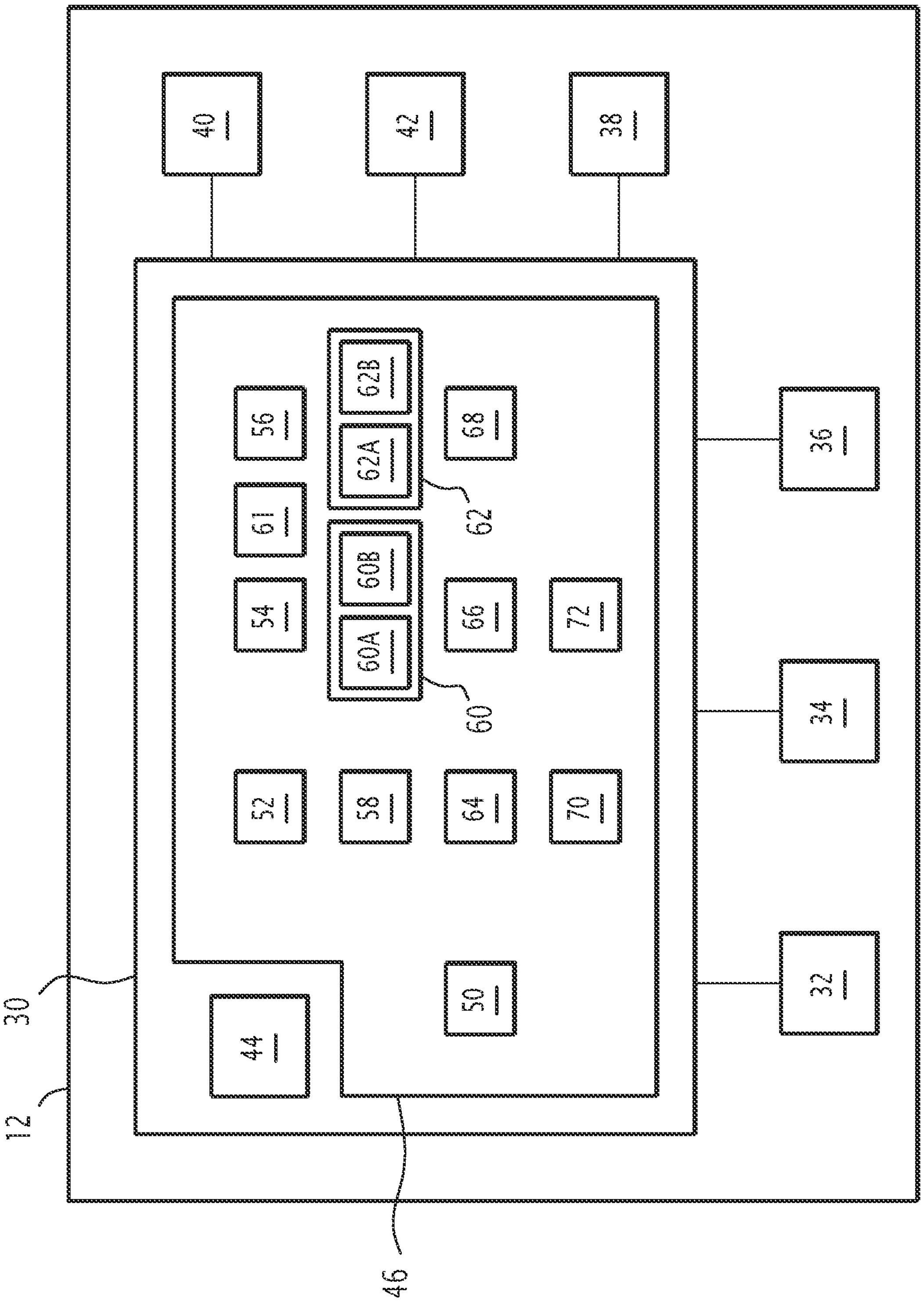
FIG. 2 is a schematic view of an aircraft including a system intended for implementing the method according to the present disclosure.

A system 30 for assisting an aircraft 12 to land on a runway 16 is illustrated schematically in FIG. 2.

The system 30 is intended to calculate, during the first in-flight approach phase $\varphi_1$, of the landing phase, the position of a target touchdown point 21 and to determine, during the second ground deceleration phase $\varphi_2$ of the landing phase, an actual deceleration profile.

The system 30 is, for example, an onboard system that meets the certification requirements of the aircraft 12. It is, for example, integrated into the avionics, in particular, in the cockpit or in a ground station for remote control of the aircraft 12.

As described below, the geographical position of the touchdown point 20, whether that is the target touchdown point 21 or that of an actual touchdown point 22, is determined, for example, by a coordinate along the axis A of the runway 16. For example, the axis A has as its origin the upstream threshold 24 of the runway 16 and an orientation directed toward a downstream threshold 25 of the runway 16. The terms "upstream" and "downstream" are defined so that the aircraft 12 is directed toward the downstream when landing, and that the upstream is the opposite of the downstream thus defined.

Note that in FIG. 1, the actual touchdown point 22 is downstream relative to the target touchdown point 21 only as an example. In other words, in the example shown in FIG. 1, the coordinate of the actual touchdown point 22 is greater than that of the target touchdown point 21. According to an example, not shown, the coordinate of the actual touchdown point 22 is less than or equal to that of the target touchdown point 21.

The runway 16 presents the above-mentioned upstream threshold 24 and the downstream threshold 25. The runway 16 extends along the axis A between the upstream threshold 24 and the downstream threshold 25. The upstream threshold 24 and the downstream threshold 25 thus correspond to the upstream and downstream ends of the runway 16 respectively.

The system 30 is intended to calculate the position of the target touchdown point 21 as a function of a target ground distance $d_{2i}$ representative of a target ground deceleration phase of the aircraft 12.

Advantageously, the system 30 is intended to calculate the position of the target touchdown point 21 additionally as a function of a target exit point 19. Even more advantageously, the target ground distance $d_{2i}$ is equal to the distance between the target touchdown point 21 and the target exit point 19.

The target ground distance $d_{2i}$ is calculated as a function of:

- a deceleration profile, called target deceleration profile, from among a plurality of deceleration profiles; and
- advantageously, the touchdown speed of the aircraft 12;
- even more advantageously, a target taxi speed.

Each deceleration profile corresponds, for example, to a deceleration type function of the aircraft 12 as a function of the ground speed of the aircraft along the runway.

The function of each deceleration profile depends, in particular, on the touchdown speed of the aircraft 12, the touchdown landing condition parameters and the runway parameters.

For example, the touchdown landing condition parameters comprise the aircraft weight, the wind applied to the aircraft, the temperature, the external pressure and the type of ground braking system on board the aircraft 12.

For example, the runway parameters comprise the runway slope, the runway condition, including, from among dry, wet and contaminated conditions.

Optionally, each deceleration profile comprises at least one constant deceleration portion and at least one transient portion located before the at least one constant deceleration portion.

The target deceleration profile is selected from among the plurality of deceleration profiles, as a function of, in particular, the runway parameters. Advantageously, the target deceleration profile is also chosen as a function of the touchdown speed of the aircraft 12 and the touchdown landing condition parameters.

Optionally, the target deceleration profile comprises at least one constant target deceleration portion between a target constant deceleration establishment point located downstream of the target touchdown point 21 and the target exit point 19, so that the aircraft reaches the target exit point 19 at the target taxi speed.

The target constant deceleration portion depends, in particular, on the runway parameters.

For example, the target deceleration profile also comprises at least one transient portion between the target touchdown point 21 and the target constant deceleration establishment point.

The at least one transient portion of the target deceleration profile is located before the at least one target constant deceleration portion.

For example, the transient portion of the target deceleration profile comprises a substantially zero deceleration part followed by one or more deceleration ramps up to the target constant deceleration.

The transient portion of the target deceleration profile depends on the target speed of the aircraft 12 at touchdown, the target constant deceleration value, the touchdown landing condition parameters and the runway parameters.

The transient portion of the target deceleration profile corresponds, for example, to a period of time between 0 s and 5 s after the target touchdown of the aircraft 12 on the runway 16.

At the target exit point 19, the aircraft 12 can, for example, evacuate the runway 16 taking an exit point in order to reach, for example, a parking area.

The target taxi speed is defined so that the aircraft 12 travelling at this speed is able to take the taxiway safely and offering optimum comfort for the occupants of the aircraft 12. This target taxi speed is generally less than 60 kt (that is, approximately 111 km/h), and in particular lies between 20 kt (that is, approximately 37 km/h) and 60 kt.

The system 30 is, in addition, intended to determine an actual deceleration profile.

The actual deceleration profile corresponds, in particular, to an update of the target deceleration profile as a function of an actual ground distance $d_{2f}$ taken between the actual touchdown point 22 and the target exit point 19.

Optionally, the actual deceleration profile comprises at least one actual constant deceleration portion between an actual constant deceleration establishment point located downstream of the actual touchdown point 22 and the target exit point 19, so that the aircraft 12 reaches the target exit point 19 at the target taxi speed.

The actual constant deceleration portion depends, in particular, on the runway parameters.

For example, the actual deceleration profile also comprises at least one transient portion between the actual touchdown point 22 and the actual constant deceleration establishment point.

The at least one transient portion of the actual deceleration profile is located before the at least one actual constant deceleration portion.

For example, the transient portion of the actual deceleration profile comprises a substantially zero deceleration part followed by one or more deceleration ramps up to the actual constant deceleration.

The transient portion of the actual deceleration profile depends on the actual touchdown speed of the aircraft 12, the actual constant deceleration value, the touchdown landing condition parameters and the runway parameters.

The transient portion of the actual deceleration profile corresponds, for example, to a period of time between 0 s and 5 s after the actual touchdown of the aircraft 12 on the runway 16.

The system 30 is configured to determine the actual deceleration profile as a function of the actual ground distance $d_{2f}$.

In particular, the system 30 is configured to determine the actual deceleration profile, in particular, the actual constant deceleration of the actual constant deceleration portion, as a function of:

- the actual ground distance $d_{2f}$;
- an actual speed $v_{trans\_f}$ of the aircraft 12 at the actual constant deceleration establishment point;
- the target taxi speed $v_{sortie\_i}$ of the aircraft 12; and
- an actual transition distance $d_{trans\_f}$ covered by the aircraft 12 between the actual touchdown point 22 and the actual constant deceleration establishment point.

With reference to FIG. 2, besides the assistance system 30, the aircraft 12 comprises a measurement and positioning system 32 and an aircraft system failure monitoring system 34. It also comprises an onboard computer 36, a display 38, a human machine interface 40 and a communications system 42.

The measurement and positioning system 32 includes, for example, sensors for measuring parameters related to the aircraft 12 and its environment, such as static temperature, static pressure, ground speed and Mach, geographical position, altitude and attitudes of the aircraft 12.

In particular, the measurement and positioning system 32 includes a sensor (not shown) able to estimate wheel touchdown, for example, a landing gear depression sensor or a wheel rotation sensor.

The measurement and positioning system 32 includes a sensor (not shown) able to estimate the ground speed, for example, an accelerometer or GPS sensor, and to estimate the position of the aircraft 12.

The measurement and positioning system 32 also includes a system for estimating the weight of the aircraft 12, for example a system for acquiring data from a flight parameter computer, a system for determining the altitude of the runway 16 and possibly its slope, for example measured by an altitude sensor or obtained from a database.

Finally, the measurement and positioning system 32 includes a system for determining the wind applied to the aircraft 12, the temperature and the pressure at the level of the landing runway 16, either by measurement sensors or by downloading meteorological data.

The monitoring system 34 is able to monitor and, in particular, to determine the current status of the aircraft 12 systems (in particular braking systems and thrust reversers, where present), taking into account any faults in these systems.

The onboard computer 36 is able to control at least one engine (for example, a turbojet), at least one brake (for example, airbrake, landing gear brake), at least one aileron, at least one control surface (for example, rudder and/or elevator) of the aircraft 12.

The onboard computer 36 is able to automatically guide the aircraft 12 toward the target touchdown point 21. Advantageously, the onboard computer 36 is also able to guide the aircraft 12 on the ground as a function, in particular, of at least one piece of ground guidance information including, for example, an actual deceleration profile.

The display 38 is able to display at least one in-flight guidance information and/or the at least one ground guidance information to at least one crew member, for example, a pilot of the aircraft 12. The display 38 is, for example, a screen on a cockpit instrument panel or a head-up display.

The human machine interface 40 is, for example, an interface between the crew member and the assistance system 30. It allows the crew member to act on at least one module of the assistance system 30 as will be described below. According to one particular example, the human machine interface 40 and the display 38 are combined.

The communication system 42 is configured to exchange data with devices external to the aircraft 12, for example with a control tower linked to the runway 16 or with another aircraft. For example, the communication system 42 comprises at least one antenna.

In particular, the communication system 42 is configured to transmit to devices external to the aircraft 12, in particular to the control tower linked to the runway 16, information such as a target occupancy time of the runway 16 and/or an actual occupancy time of the runway 16.

The assistance system 30 is connected to the measurement and positioning system 32, the monitoring system 34, the onboard computer 36, the display 38, the human machine interface 40 and the communication system 42.

It includes at least one processor 44 and a memory 46 containing software modules able to be executed by the processor 44.

The memory 46 comprises a module 50 for acquiring the actual touchdown speed of aircraft 12, touchdown condition parameters and runway parameters.

The memory 46 further comprises a module 52 for determining a target exit point 19 to be taken by the aircraft 12 and a target taxi speed at which the aircraft 12 has to travel to the target exit point 19.

The memory 46 further comprises a module 54, for calculating the target ground distance $d_{2i}$ representative of the target ground deceleration phase of the aircraft 12, and a module 56 for calculating the actual ground distance det.

The memory 46 further comprises a module 58 for calculating the position of the target touchdown point 21 on the basis of the target ground distance $d_{2i}$ and also advantageously as a function of the target exit point 19, in particular a maximum ground distance $d_{2max}$ separating the upstream threshold 24 of the runway 16 from the target exit point 19.

The memory 46 also comprises a module 60 for determining the target deceleration profile and a module 62 for determining an actual deceleration profile.

The memory 46 further comprises a database 61 comprising at least one table combining with each of a set comprising:

- aircraft touchdown speed;
- constant deceleration value;
- touchdown landing condition parameter; and
- runway parameters;
- a transient portion of the combined deceleration profile (notably a speed $v_{trans}$ of the aircraft 12 at the constant deceleration establishment point and a transition distance $d_{trans}$), whether for a target or actual deceleration.

In particular, the database 61 table is generated by modeling and simulation. For example, this table is generated by a neural network.

The memory 46 also comprises a module 64 for connection to a terrain database, the terrain database containing, for example, information relating to the length and slope of the runway 16, and information relating to the exit point 18 positions that can be taken by the aircraft 12.

The memory 46 also comprises a module 66 for guiding the aircraft 12 and a safety module 68.

The memory 46 also comprises a module 70 for calculating a target runway 16 occupancy time and a module 72 for calculating an actual runway 16 occupancy time.

In the following, will first be described, the memory 46 modules used during a flight approach phase of the aircraft 12.

The acquisition module 50 is able to acquire parameters relating to touchdown conditions and runway parameters.

In particular, the acquisition module 50 is able to acquire information representative of the state of the runway 16. The information representative of the state of the runway 16 is generated by the crew via the human machine interface 40, for example. In particular, the information representative of the state of the runway 16 is pre-selected by the crew, in particular, from among the dry state, the wet state and a contaminated state.

Advantageously, the acquisition module 50 is able to acquire a target taxi speed value corresponding to the target exit.

Advantageously, the acquisition module 50 is able to obtain information relating to the weight of the aircraft 12 and the slope of the landing runway 16 from the terrain database.

The acquisition module 50 is also able to determine the altitude, the wind applied to the aircraft 12, the temperature, the static pressure at the landing runway 16 as well as the type of ground braking system on board the aircraft 12.

The module 52 for determining the target exit point 19 and the target taxi speed is able to interrogate the terrain database via the connection module 64 to determine exit points 18 that can be taken by the aircraft 12.

The determination module 52 is also able to display the determined exit points 18 available to the crew member via the display 38.

The crew member can then select the target exit point 19 from among the exit points 18 available, via the human machine interface 40. This selected exit point 18 is then considered as the target exit point 19 to be taken by the aircraft 12.

The determination module 52 is also able to interrogate the acquisition module 50 to determine the target taxi speed at which the aircraft 12 has to take the target exit. For example, the determination module 52 is configured to retrieve the target taxi speed value acquired by the acquisition module 50.

The determination module 52 is able to interrogate the terrain database to determine the position of the target exit point 19 and the maximum ground distance $d_{2max}$.

The determination module 60 is able to determine the target speed of the aircraft 12 at the touchdown point as a function of, for example, the weight of the aircraft 12, the configuration of the aircraft 12 (in particular the configuration of the flaps of the aircraft 12) as well as the weather conditions, in particular those prevailing on the runway (wind, temperature and static pressure in particular).

The determination module 60 is able to determine the target deceleration profile from among the plurality of deceleration profiles as a function of the runway parameters. Advantageously, the determination module 60 is also able to determine the target deceleration profile as a function of the touchdown speed of the aircraft 12 and the touchdown landing condition parameters.

The determination module 60 comprises, for example, a sub-module 60A for determining the target constant deceleration and a sub-module 60B for determining the transient portion of the target deceleration profile.

The sub-module 60A is able to interrogate acquisition module 50 to acquire the runway parameters.

The sub-module 60A is configured to determine the target constant deceleration as a function of the runway parameters.

The sub-module 60B is configured to determine the transient portion of the target deceleration profile as a function of the target touchdown speed of the aircraft 12, the target constant deceleration value determined by the sub-module 60A, the touchdown condition parameters and the runway parameters, in particular by interrogating the database 61.

The module 54 for calculating the target ground distance $d_{2i}$ is able to interrogate the module 52 for determining the target exit point 19 and the target taxi speed.

The module 54 for calculating the target ground distance $d_{2i}$ is able to interrogate the module 60 for determining the target deceleration profile and to calculate the target ground distance $d_{2i}$ as a function of the target deceleration profile received from the determination module 60, and/or the touchdown speed of the aircraft 12 and/or the target taxi speed.

In particular, the calculation module 54 is able to interrogate the determination sub-modules 60A and 60B and to calculate the target ground distance $d_{2i}$ as a function of the transient portion of the target deceleration profile received from the determination sub-module 60B and the target constant deceleration received from the determination sub-module 60A.

Advantageously, the calculation module 54 is configured to calculate:

a target transition distance $d_{trans\_i}$ corresponding to the distance the aircraft 12 travels between the target touchdown point 21 and the target constant deceleration establishment point; and the speed $v_{trans\_i}$ of the aircraft 12 corresponds to the target speed of the aircraft 12 at the target constant deceleration establishment point;

from the speed of the aircraft 12 at the target touchdown point 21 and the transient portion of the target deceleration profile received from the determination sub-module 60B.

The target ground distance $d_{2i}$ is defined between the target touchdown point 21 and the target exit point 19, so that the aircraft 12 reaches the target exit point 19 at the target taxi speed.

The target ground distance $d_{2i}$ is calculated by the equation:

$$d_{2i} = d_{trans\_i} + \frac{v_{sortie\_i}^2 - v_{trans\_i}^2}{2 \times a_i}$$

where:

$d_{trans\_i}$ is the target transition distance;

$v_{trans\_i}$ is the target speed of the aircraft 12 at the target constant deceleration establishment point;

$v_{sortie\_i}$ is the target taxi speed at the target exit point 19; and $a_i$ is a target constant deceleration value of the target deceleration profile.

In particular, the value $a_i$ of the target constant deceleration of the target deceleration profile is negative.

The calculation module 58 is configured to calculate the position of the target touchdown point 21. Advantageously, the calculation module 58 is configured to determine the position of the target touchdown point 21 within a predetermined interval of the touchdown positions along the runway 16. For example, this predetermined interval is usually defined by ground markings on the runway 16, in particular an extreme upstream marking and an extreme downstream marking delimiting a preferred touchdown zone.

To this end, the calculation module 58 is able to interrogate the calculation module 54 and the determination module 52 to acquire the target ground distance $d_{2i}$ and the maximum ground distance $d_{2max}$.

The calculation module 58 is able to calculate the position of the target touchdown point 21 so that a target air distance dii, taken along the runway 16 between the upstream threshold 24 and the target touchdown point 21, is equal to the maximum ground distance $d_{2max}$ separating the upstream threshold 24 from the target exit point 19 minus the target ground distance $d_{2i}$.

In other words, the target air distance dii is calculated by the equation:

$$d_{1i} = d_{2max} - d_{2i}$$

The guidance module 66 is intended to generate at least one in-flight guidance information for the aircraft 12. The at least one in-flight guidance information of the aircraft 12 is, in particular, representative of a guidance of the aircraft 12 toward the target touchdown point 21, the guidance being carried out on at least one portion of a landing trajectory T of the aircraft 12.

Figure 3:
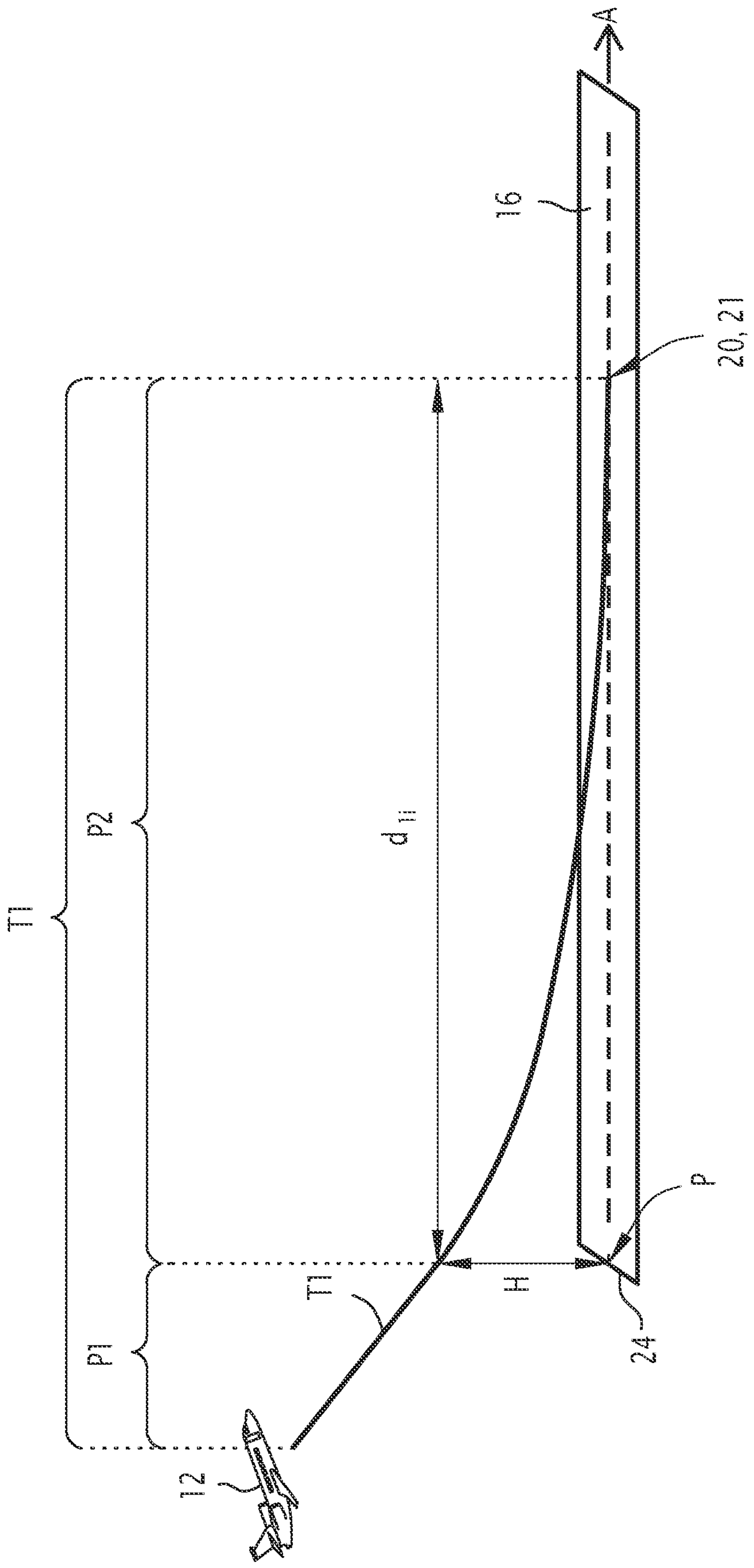
FIG. 3 is a schematic view of an example of an aircraft trajectory during implementation of the method according to the present disclosure.
Figure 4:
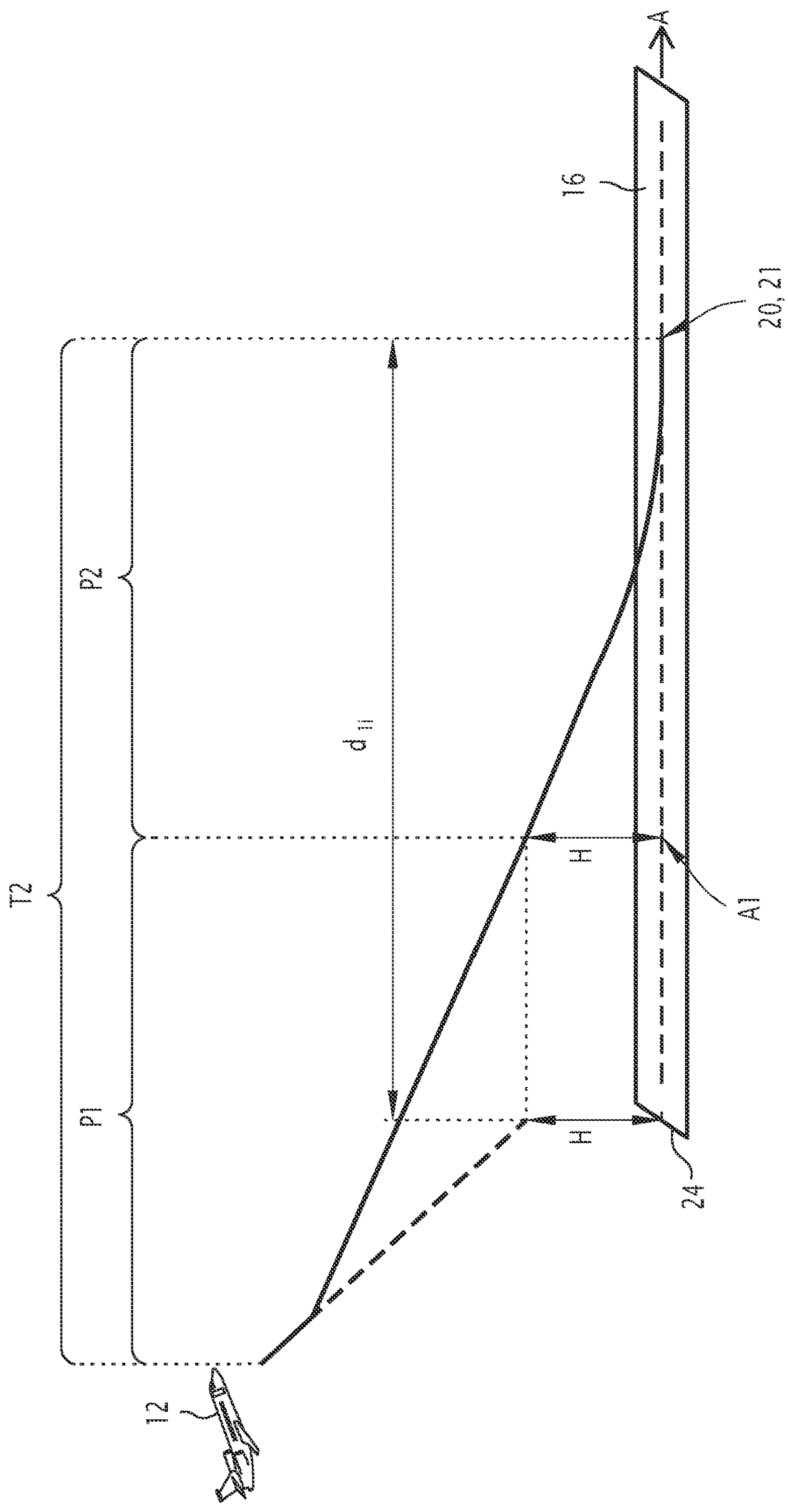
FIG. 4 is a schematic view of an alternative of an aircraft trajectory during implementation of the method according to the present disclosure.
Figure 5:
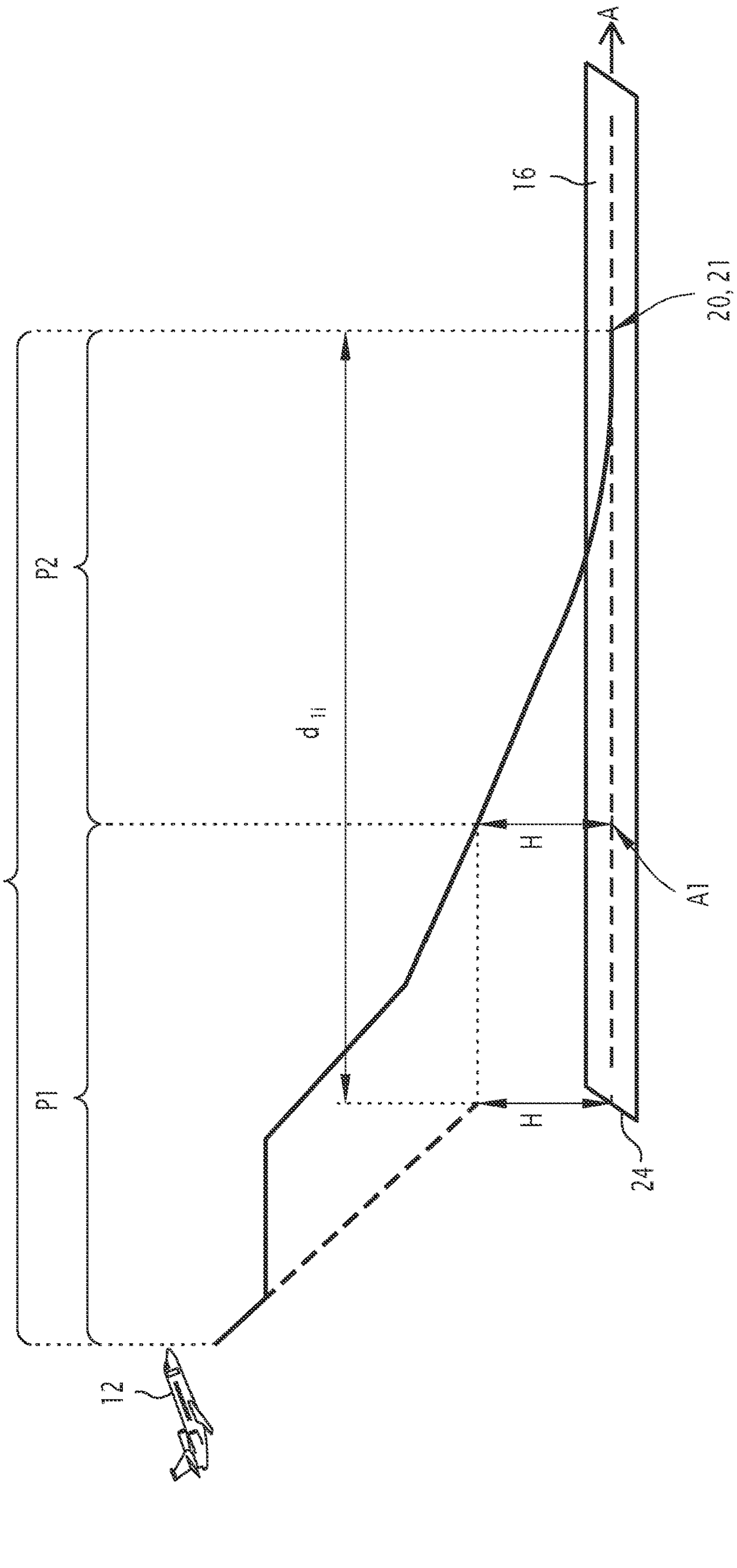
FIG. 5 is a schematic view of another alternative of an aircraft trajectory when implementing the method according to the present disclosure.

Examples of landing paths T are shown in FIGS. 3 to 5.

In particular, the landing path T comprises a first portion P1 at which the altitude of the aircraft 12 is greater than a nominal altitude H, and a second portion P2 at which the altitude of the aircraft 12 is less than the nominal altitude H.

By "altitude" it is understood to mean the altitude relative to the ground, in particular relative to the runway 16.

Guidance is advantageously carried out on the first portion P1 and/or on the second portion P2.

Advantageously, the landing path T also comprises a touchdown by the aircraft 12 of the runway 16 at the target touchdown point 21.

The nominal altitude H is the altitude at which the aircraft 12 can begin a flare to touch down on the runway 16 within the predetermined range of touchdown positions during a conventional landing. This nominal altitude H is, for example, between 35 ft (approx. 11 m) and 70 ft (approx. 21 m).

The guidance module 66 is able to interrogate the target touchdown point position calculation module 58 to acquire the position of the target touchdown point 21.

The at least one in-flight guidance information advantageously comprises an attitude profile and/or a thrust profile of the aircraft 12, in particular as a function of the position of the target touchdown point 21.

FIG. 3 illustrates a first example of a landing path T1.

According to the example shown in FIG. 3, the altitude of the aircraft 12 is substantially equal to the nominal altitude H when the aircraft 12 is in line with the upstream threshold 24 of the runway 16.

Thus, the first portion P1 of the landing path T1 is upstream of the upstream threshold 24 of the runway 16, and the second portion P2 of the landing path T1 is downstream of the upstream threshold 24.

According to the example shown in FIG. 3, the in-flight guidance of aircraft 12 is carried out on the second portion P2. In particular, the second portion P2 of the landing path T1 corresponds to a flaring specifically adapted so that the aircraft 12 aims to touchdown at the target touchdown point 21. This flaring is obtained thanks to the attitude profile and/or thrust profile of the aircraft 12 calculated by the guidance module 66.

FIG. 4 illustrates a second example of a landing path T2.

According to the example shown in FIG. 4, the altitude of the aircraft 12 is substantially equal to the nominal altitude H when the aircraft 12 is in line with a point A1 located downstream of the upstream threshold 24 of the landing runway 16.

Thus, the first portion P1 of the landing path T2 is upstream of the point A1 and the second portion P2 of the landing path T2 is downstream of the point A1.

According to the example of FIG. 4, the guidance of the aircraft 12 is carried out on the first portion P1. The second portion P2 of the landing path T2 then corresponds to a conventional flaring of the aircraft 12, for example without guidance. In particular, the first portion P1 of the landing path T2 corresponds to a descent of the aircraft 12 according to a path specifically adapted so that the aircraft 12 aims to touchdown at the target touchdown point 21, if it subsequently follows the conventional flaring of the second portion P2. This path is obtained using the attitude profile and/or the thrust profile of the aircraft 12 calculated by the guidance module 66. As illustrated in the example of FIG. 4, the specifically adapted path comprises a specific slope.

FIG. 5 illustrates a third example of a landing path T3.

According to the example of FIG. 5, guidance of the aircraft 12 is similar to that in the example of FIG. 4. In comparison with the example of FIG. 4, the specifically adapted path in the example of FIG. 5, comprises at least one slope and at least one level path. When the specifically adapted trajectory comprises a plurality of slopes, the slopes are identical or distinct.

According to an example, not illustrated, the altitude of the aircraft 12 above the runway 16 is substantially equal to the nominal altitude H when the aircraft 12 is in line with the upstream threshold 24 of the runway or in line with another point on the runway 16. The guidance of the aircraft 12 is then carried out over the first portion P1, as, according to the example of FIG. 4 or FIG. 5, except that the guidance of the aircraft 12 is also carried out over the second portion P2, as, according to the example of FIG. 3.

In particular, the guidance module 66 is configured to lengthen the path of the aircraft 12 in flight to allow the aircraft 12 to fly over a certain portion of the predetermined touchdown position interval without landing there, and to shift its touchdown longitudinally downstream in order to reach the target touchdown point 21. In the example of FIG. 3, the flare performed by the aircraft 12 thus extends its flight path, even though the aircraft 12 has overflown the upstream threshold 24 of the runway 16 at nominal altitude H. In the examples of FIGS. 4 and 5, the specifically adapted path followed by the aircraft 12 also extends its overflight of the runway.

The guidance module 66 is able to send guidance information to the display 38 for display to the crew member.

The safety module 68 is able to interrogate the module 58 for calculating the position of the target touchdown point 21 to retrieve the position of the target touchdown point 21.

The safety module 68 is also able to interrogate the terrain database via the connection module 64 to determine a runway end distance $d_3$ taken along runway 16 between the target exit point 19 and the downstream threshold 25.

If the end of the runway distance $d_3$ is less than a safety distance, the safety module 68 is able to move the target touchdown point 21 closer to the upstream threshold 24.

The module 70 for calculating the target runway 16 occupancy time is configured to calculate the target runway 16 occupancy time as a function of the target exit point 19, the target taxi speed, the position of the target touchdown point 21, the target deceleration profile and advantageously the attitude profile and/or thrust profile of the aircraft 12.

The target runway occupancy time 16 corresponds to the time during which the aircraft 12 travels from the line of the upstream threshold 24 to the target exit point 19.

The memory 46 modules used during an actual ground deceleration phase of the aircraft 12 are described below.

The acquisition module 50 is able to interrogate the measurement and positioning system 32 to determine the time of touchdown, the position of the actual touchdown point 22 and the actual speed of the aircraft 12 at the time of actual touchdown.

The module 56 for calculating the actual ground distance $d_{2f}$, is able to interrogate the acquisition module 50 and acquire the position of the actual touchdown point 22.

The actual deceleration profile determination module 62 is able to interrogate the calculation module 56 to acquire the actual ground distance $d_{2f}$.

The determination module 62 is also able to interrogate the acquisition module 50 to acquire the touchdown condition parameters and the runway parameters.

The determination module 62 is also able to interrogate the acquisition module 50 to acquire the actual speed of the aircraft 12 at the moment of actual touchdown.

The determination module 62 is also able to determine the actual deceleration profile as a function of:

- the actual ground distance $d_{2f}$;
- the actual speed of the aircraft 12 at the moment of touchdown; and
- the target taxi speed.

In particular, the determination module 62 is configured to determine the actual deceleration profile as soon as the aircraft 12 actually touches down.

The determination module 62 comprises, for example, a sub-module 62A for determining the actual constant deceleration and a sub-module 62B for determining the transient portion of the actual deceleration profile.

The sub-module 62A is configured to determine the actual constant deceleration as a function of:

- the speed $v_{trans\_f}$ of the aircraft 12 at the actual constant deceleration establishment point;
- the target taxi speed $v_{sortie\_i}$;
- the actual ground distance $d_2$f; and
- an actual transition distance $d_{trans\_f}$ corresponding to the distance between the actual touchdown point 22 and the actual constant deceleration establishment point.

Advantageously, the value of the real constant deceleration $a_f$ is set by the equation:

$$a_f = \frac{v_{sortie\_i}^2 - v_{trans\_f}^2}{2 \times (d_{2f} - d_{trans\_f})}$$

where:

- $v_{trans\_f}$ is the speed of the aircraft 12 at the actual constant deceleration establishment point;
- $v_{sortie\_i}$ is the target taxi speed at the target exit point 19;
- $d_{2f}$ is the actual ground distance; and
- $d_{trans\_f}$ is the actual transition distance.

Even more advantageously, the sub-module 62A is configured to determine the actual constant deceleration immediately after touchdown, in particular as soon as the parameters $v_{trans\_f}$, $v_{sortie\_i}$, $d_{2f}$ and $d_{trans\_f}$ are available.

The sub-module 62B is configured to determine the transient portion of the actual deceleration profile as a function of the actual touchdown speed of the aircraft 12, the touchdown landing condition parameters and the runway parameters, in particular by interrogating the database 61.

The guidance module 66 is intended to generate at least one piece of ground guidance information for the aircraft 12 as a function of the actual deceleration profile. It is able to interrogate the actual deceleration profile determination module 62 to acquire the actual deceleration profile.

The guidance module 66 is also able to send ground guidance information to the onboard computer 36.

The onboard computer 36 is able to guide the aircraft 12 on the ground so that it applies the actual deceleration profile.

A method of assisting an aircraft 12 to land on a runway 16, implemented with the aid of the assistance system 30, will now be described with reference to FIGS. 6 and 7.

Figure 6:
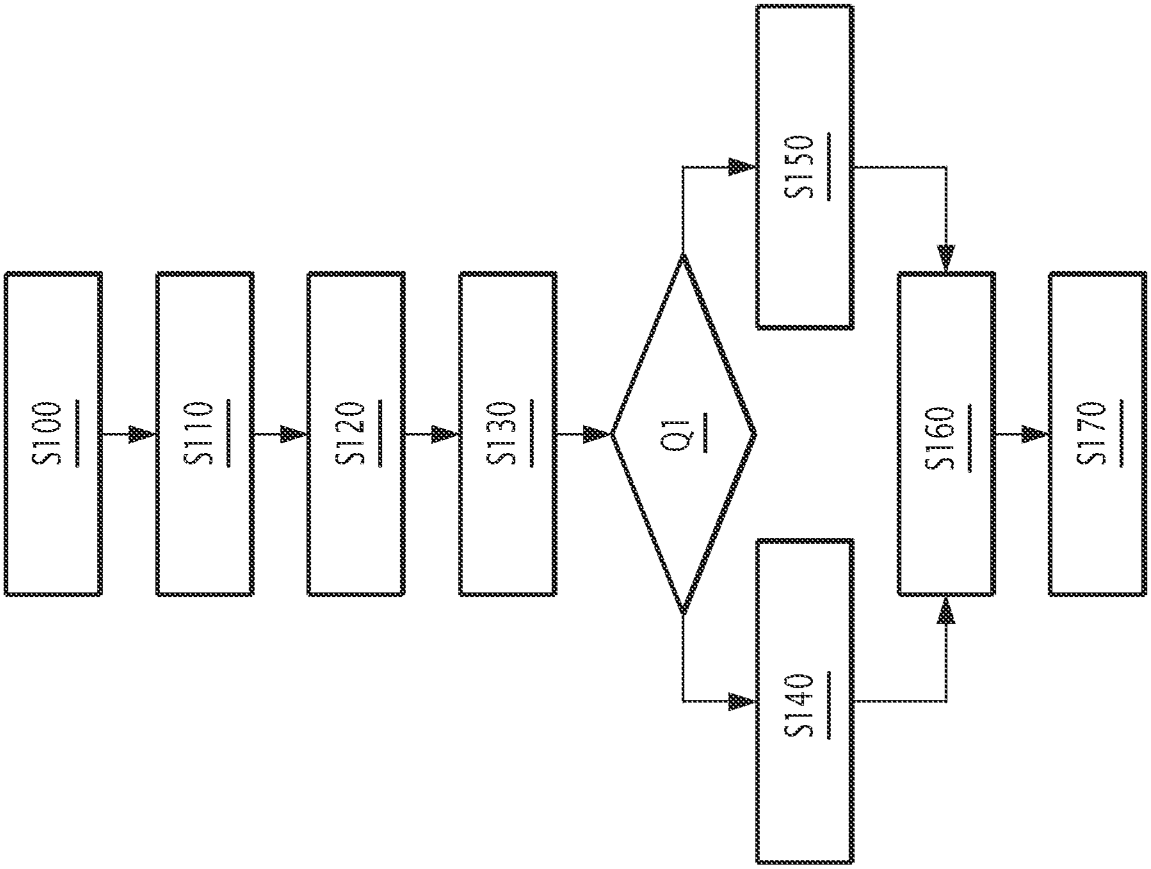
FIG. 6 is a flow chart illustrating the implementation of the method according to the present disclosure.
Figure 7:
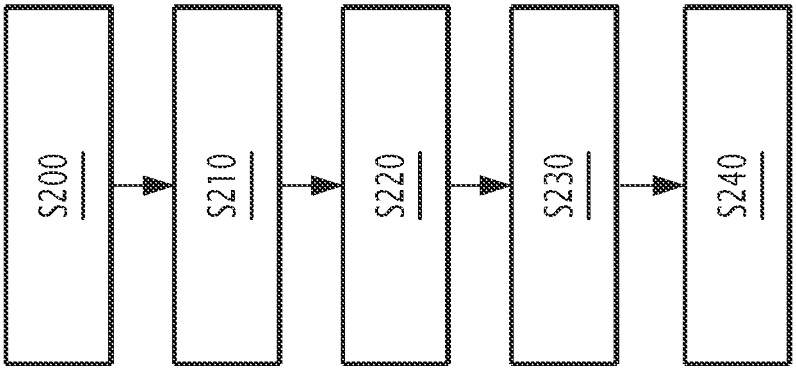
FIG. 7 is a flow chart illustrating the implementation of the process according to the present disclosure.

With reference to FIG. 6, during a first step S100, the target exit point 19 to be taken by the aircraft 12 and the target taxi speed at which the aircraft 12 has to take the target exit 19 are determined.

In particular, during the first step S100, the module 52 for determining a target exit point 19 and a target taxi speed interrogates the terrain database via the connection module 64 to determine the exit points 18 that can be taken by the aircraft 12.

The determination module 52 displays the exit points 18 that can be taken by the aircraft 12 via the display 38 to at least one crew member.

For example, the crew member selects a target exit point 19 from among the exit points 18 that can be taken by the aircraft 12 via the human machine interface 40. The determination module 52 then considers that the target exit point 19 chosen by the crew member is the target exit point 19 to be taken by the aircraft 12.

The determination module 52 interrogates the acquisition module 50 to determine the target taxi speed at which the aircraft 12 has to take the target exit point 19.

The determination module 52 interrogates the terrain database via the connection module 64 to determine the position of the target exit point 19 and the maximum ground distance $d_{2max}$ separating the upstream threshold 24 of the landing runway 16 from the target exit point 19.

Advantageously, during a second step S110, the target deceleration profile is determined as a function of the runway parameters. Advantageously, the target deceleration profile is also determined as a function of the touchdown speed of the aircraft 12 and the touchdown landing condition parameters.

The module 60 interrogates the acquisition module 50 to determine the target speed of the aircraft 12 at touchdown, and to receive touchdown landing condition parameters and runway parameters.

Advantageously, the sub-module 60A determines the target constant deceleration as a function of the runway parameters, in particular, by interrogating the database 61.

Even more advantageously, the sub-module 60B determines the transient portion of the target deceleration profile as a function of the target speed of the aircraft 12 on touchdown, the value of the target constant deceleration determined by the sub-module 60A, the touchdown landing condition parameters and the runway parameters, in particular, by interrogating the database 61.

During a third step S120, the target ground distance $d_{2i}$ is calculated.

In particular, the module 54 for calculating the target ground distance $d_{2i}$ interrogates the determination module 52 to receive the target taxi speed.

In particular, the module 54 for calculating the target ground distance $d_{2i}$ interrogates the module 60 for determining the target deceleration profile to receive the target deceleration profile.

The calculation module 54 calculates the target ground distance $d_{2i}$ as a function of the target deceleration profile, advantageously the touchdown speed of aircraft 12 and even more advantageously the target taxi speed.

In particular, the calculation module 54 interrogates the determination sub-modules 60A and 60B and calculates the target ground distance $d_{2i}$ as a function of the transient portion of the target deceleration profile received from the determination sub-module 60A and the target constant deceleration received from the determination sub-module 60B.

Advantageously, the calculation module 54 calculates the target transition distance $d_{trans\_i}$ and the speed $v_{trans\_i}$ of the aircraft 12 at the target constant deceleration establishment point from the speed of the aircraft 12 at the moment of touchdown and the transient portion of the target deceleration profile.

During a fourth step S130, the position of the target touchdown point 21 is calculated on the basis of the target ground distance $d_{2i}$.

In particular, the module 58 for calculating the position of the target touchdown point 21 interrogates the module 54 for calculating the target ground distance $d_{2i}$ to receive the target ground distance $d_{2i}$ and interrogates the module 52 for determining the target exit point 19 to acquire the maximum ground distance $d_{2max}$.

Advantageously, the module 58 calculates the position of the target touch point 21 so that the target air distance dii is equal to maximum ground distance $d_{2max}$ minus the target ground distance $d_{2i}$.

Even more advantageously, the calculation module 58 determines the position of the target touchdown point 21 so that it lies within the predetermined range of touchdown positions along the runway 16.

During a test step Q1, the safety module 68 interrogates the calculation module 58 for the position of the target touchdown point 21 to acquire the position of the target touchdown point 21.

The safety module 68 interrogates the terrain database via the connection module 64 to determine the runway end distance $d_3$ taken along the runway 16 between the target exit point 19 and the downstream threshold 25 of the runway 16.

If the runway end distance $d_3$ is less than a safety distance, during a fifth step S140, the safety module 68 moves the target touchdown point 21 closer to the upstream threshold 24 of the runway 16.

If the runway end distance $d_3$ is greater than or equal to the safety distance, the position of the target touchdown point 21 remains unchanged during a sixth step S150.

During a seventh step S160, following the fifth step S140 or the sixth step S150, the target runway 16 occupancy time is calculated as a function of the target exit point 19, the target taxi speed, the position of the target touchdown point 21, the target deceleration profile and advantageously the attitude profile and/or thrust profile of the aircraft 12.

In particular, the target occupancy time is calculated by the module 70 for calculating the target occupancy time of the runway 16.

Advantageously, during the seventh step S160, the target occupancy time of the runway 16 is transmitted to the control tower linked to the runway 16 via the communication system 42.

During an eighth step S170, the guidance module 66 generates the at least one flight guidance information for the aircraft 12.

In particular, the guidance module 66 interrogates the calculation module 58 for the position of the target touchdown point 21 to acquire the position of the target touchdown point 21.

In particular, the guidance module 66 calculates the attitude profile and/or thrust profile of the aircraft 12, advantageously as a function of the position of the target touchdown point 21.

The guidance module 66 sends the in-flight guidance information to the display 38. The guidance information is transmitted to the crew member via the display 38.

The crew member controls the aircraft 12 so as to follow the flight guidance information displayed by the display 38.

Although in FIG. 6, the eighth step S170 is illustrated as taking place after the seventh step S160, the eighth step S170 can also be carried out in parallel with the seventh step S160.

In the following, with reference to FIG. 7, the steps of the method taking place during the ground deceleration phase of the aircraft 12 are described.

During a first step S200, the actual touchdown point 22 is determined.

In particular, the acquisition module 50 interrogates the measurement and positioning system 32 to determine the time at which the touchdown occurs, the actual position of the touchdown point 22 and the actual speed of the aircraft 12 at the time of the actual touchdown.

During a second step S210, the actual ground distance $d_2$ is determined.

In particular, the module 56 for calculating the actual ground distance $d_{2f}$ interrogates the acquisition module 50 to acquire the position of the actual touchdown point 22.

The module 56 determines the actual ground distance det.

During a third step S220, the actual deceleration profile is determined.

Advantageously, the actual deceleration profile determination module 62 interrogates the calculation module 56 for the actual ground distance der to acquire the actual ground distance $d_{2f}$.

The determination module 62 also interrogates the acquisition module 50 to acquire the touchdown condition parameters and the runway parameters.

The determination module 62 also interrogates the acquisition module 50 to acquire the actual speed of the aircraft 12 at the moment of actual touchdown.

The determination module 62 determines the actual deceleration profile as a function of:

the actual ground distance $d_{2f}$, the actual speed of the aircraft at the moment of touchdown; and the target taxi speed.

In particular, the determination module 62 determines the actual deceleration profile as soon as the aircraft 12 has touched down.

Advantageously, the sub-module 62B for determining the transient portion of the actual deceleration profile determines the transient portion of the actual deceleration profile, in particular as soon as the acquisition module 50 determines the instant at which touchdown occurs, the position of the actual touchdown point 22 and the speed of the aircraft 12 at the moment of actual touchdown, as a function of the actual speed of the aircraft 12 at touchdown, the landing condition parameters at touchdown and the runway parameters, in particular by interrogating the database 61. In particular, the actual transition distance $d_{trans\_f}$ is determined.

Advantageously, the sub-module 62A for determining the actual constant deceleration determines the actual constant deceleration, in particular as soon as the sub-module 62B determines the transient portion of the actual deceleration profile.

During a fourth step S230, at least one ground guidance information for the aircraft 12 is generated.

In particular, the guidance module 66 interrogates the determination module 62 for the actual deceleration profile to retrieve the actual deceleration profile.

The guidance module 66 generates the ground guidance information for the aircraft 12 as a function of the actual deceleration profile.

The guidance module 66 sends the ground guidance information to the onboard computer 36.

The onboard computer 36 guides the aircraft 12 on the ground so that it applies the deceleration profile.

During a fifth step S240, the actual occupancy time of the runway 16 is calculated as a function of the time at which the aircraft passes in line with the upstream threshold 24 and the time at which the aircraft takes the target exit.

In particular, the actual occupancy time is calculated by the module 72 for calculating the actual occupancy time of the runway 16.

The system 30 according to the present disclosure allows to reduce the occupancy time of the runway 16 by the aircraft 12 by reducing the duration of the ground deceleration phase, during which the aircraft 12 travels at a relatively low speed, and by increasing the duration of the in-flight approach phase, during which the aircraft 12 travels at a relatively high speed. In particular, calculating the target ground distance as a function of the target deceleration profile, and notably guiding the aircraft 12 toward the target touchdown point, allows to reduce the runway 16 occupancy time taken by the aircraft 12, for example, by avoiding the aircraft 12 touching down on the runway 16 upstream of the target touchdown point 21.

In addition, the system 30 improves comfort for any occupants of the aircraft 12 during the landing phase by applying a constant deceleration value to the aircraft 12 during the ground deceleration phase.

This avoids the aircraft 12 from braking too hard, slowing down on the runway 16 and increasing occupancy time, or from jerking when the crew or a control system needs to adjust speed.

In addition, the system 30 also allows to predict the runway occupancy time in order to facilitate load distribution for air traffic on the runway 16.

According to one alternative, the sub-module 60B is configured to determine the transient portion of the target deceleration profile as a function of the target touchdown speed of the aircraft 12, the target constant deceleration value determined by the sub-module 60A, the touchdown condition parameters and the runway parameters, in particular on the basis of an equation.

According to another alternative, the determination module 52 is configured to determine the target taxi speed at which the aircraft 12 has to take the target exit, using a predefined default value. This predefined default value can, for example, be modified by the crew via the human machine interface 40.

According to another alternative, the onboard computer 36 is able to automatically guide the aircraft 12 during the in-flight approach phase as a function of the in-flight guidance information comprising an attitude profile and/or a thrust profile and/or a slope profile of the aircraft 12.

The onboard computer 36 is, for example, able to guide the aircraft 12 toward the target touchdown point 21 during the in-flight approach phase.

The onboard computer 36 is, for example, able to guide the aircraft 12 toward the target exit point 19 during the ground deceleration phase.

The guidance module 66 is then able to send the in-flight guidance information to the onboard computer 36.

According to this alternative, after calculating the in-flight guidance information, the guidance module 66 sends it to the onboard computer 36. The onboard computer 36 then controls the aircraft 12 so that the aircraft 12 complies with the guidance information.

According to another alternative, the target taxi speed and target ground distance da are defined directly by the crew via the human machine interface 40. In particular, the determination module 52 is configured to interrogate the human machine interface 40 to determine the target taxi speed and target ground distance da.

What is claimed is:

1. A method of assisting an aircraft to land on a runway, the method comprising the following steps, implemented prior to touchdown of the aircraft on the runway:

determining a target exit point for exiting the runway to be taken by the aircraft and a target taxi speed at which the aircraft is to take the target exit;

calculating a target ground distance representative of a ground deceleration phase of the aircraft;

calculating a position of a target touchdown point on the basis of the target ground distance; and generating at least one in-flight guidance information for guiding the aircraft, representative of a guidance of the aircraft toward the target touchdown point;

wherein the target ground distance is calculated as a function of a target deceleration profile so that the aircraft reaches the target exit point at the target taxi speed, wherein the position of the target touchdown point is calculated so that a target air distance representative of an in-flight approach phase of the aircraft, taken along the runway between an upstream threshold of the runway and the target touchdown point, is equal to a maximum ground distance separating the upstream threshold from the target exit point minus the target ground distance.

2. The method according to claim 1, further comprising a step of determining the target deceleration profile as a function of runway parameters.

3. The method according to claim 1, wherein a landing path of the aircraft comprises:

a first portion over which an altitude of the aircraft is greater than a nominal altitude; and a second portion over which the altitude of the aircraft is less than the nominal altitude;

the in-flight guidance of the aircraft toward the target touchdown point being carried out on the first portion and/or on the second portion.

4. The method according to claim 3, wherein the in-flight guidance information comprises an attitude profile and/or a thrust profile of the aircraft.

5. The method according to claim 3, wherein the in-flight guidance information is displayed on a display for at least one pilot of the aircraft.

6. The method according to claim 3, wherein the altitude of the aircraft is substantially equal to the nominal altitude when the aircraft is above an upstream threshold of the runway.

7. The method according to claim 1, wherein an onboard computer of the aircraft automatically guides the aircraft toward the target touchdown point.

8. The method according to claim 1, wherein when a runway end distance taken along the runway between the target exit point and a downstream threshold of the runway is less than a safety distance, the target touchdown point is brought closer to an upstream threshold of the runway.

9. The method according to claim 1, wherein the target deceleration profile comprises at least one portion of target constant deceleration between a target constant deceleration establishment point located downstream of the target touchdown point and the target exit point.

10. The method according to claim 9, wherein the target deceleration profile further comprises at least one transient portion between the target touchdown point and the target constant deceleration establishment point.

11. The method according to claim 9, wherein the target ground distance is calculated by the equation:

$$d_{2i} = d_{trans\_i} + \frac{v_{sortie\_i}^2 - v_{trans\_i}^2}{2 \times a_i}$$

wherein:

$d_{2i}$ is the target ground distance;

$d_{trans\_i}$ is a target transition distance covered by the aircraft between the target touchdown point and the target constant deceleration establishment point;

$v_{trans\_i}$ is a target speed of the aircraft at the target constant deceleration establishment point;

$v_{sortie\_i}$ is the target taxi speed of the aircraft; and $a_i$ is a value, in particular a negative value, of the target constant deceleration.

12. The method according to claim 1, further comprising the following steps, implemented after touchdown of the aircraft on the runway:

determining an actual touchdown point;

determining an actual ground distance taken along the runway between the actual touchdown point and the target exit point; and determining an actual deceleration profile so that a ground speed of the aircraft is the target taxi speed when the aircraft has covered the actual ground distance on the ground.

13. The method according to claim 12, wherein the actual deceleration profile comprises at least one portion of actual constant deceleration between an actual constant deceleration establishment point located downstream of the actual touchdown point and the target exit point.

14. The method according to claim 13, wherein the actual deceleration profile further comprises at least one transient portion between the actual touchdown point and the actual constant deceleration establishment point.

15. The method according to claim 13, wherein a value of an actual constant deceleration $a_f$ is calculated by the equation:

$$a_f = \frac{v_{sortie\_i}^2 - v_{trans\_f}^2}{2 \times (d_{2f} - d_{trans\_f})}$$

wherein:

$v_{trans\_f}$ is an actual speed of the aircraft at the point of establishment of the actual constant deceleration;

$v_{sortie\_i}$ is the target taxi speed of the aircraft;

$d_{2f}$ is the actual ground distance; and $d_{trans\_f}$ is an actual transition distance covered by the aircraft between the actual touchdown point and the actual constant deceleration establishment point.

16. A system for assisting an aircraft to land on a runway, comprising:

a module for determining a target exit point for exiting the runway to be taken by the aircraft and a target taxi speed at which the aircraft is to take the target exit;

a module for calculating a target ground distance representative of a ground deceleration phase of the aircraft; and a module for calculating a position of a target touchdown point on the basis of the target ground distance;

wherein the target ground distance is calculated as a function of a target deceleration profile so that the aircraft reaches the target exit point at the target taxi speed.

17. The system according to claim 16, wherein the target deceleration profile comprises at least one portion of target constant deceleration between a constant target constant deceleration establishment point located downstream of the target touchdown point and the target exit point.

18. The system according to claim 16, further comprising:

an acquisition module able to determine the position of an actual touchdown point;

a module for calculating an actual ground distance taken along the runway between the actual touchdown point and the target exit point; and a module for determining an actual deceleration profile, the actual deceleration profile being such that a ground speed of the aircraft is the target taxi speed when the aircraft has covered the actual ground distance.

19. The system according to claim 18, wherein the actual deceleration profile comprises at least one portion of actual constant deceleration between an actual constant deceleration establishment point located downstream of the actual touchdown point and the target exit point.

* * * * *